United States Patent [19]

Hayakawa et al.

[11] Patent Number: 4,922,765
[45] Date of Patent: May 8, 1990

[54] LUBRICATING STRUCTURE FOR TRANSMISSION MECHANISM

[75] Inventors: Yoichi Hayakawa; Takahiro Yamashita; Kazuaki Watanabe; Yoshiharu Harada, all of Aichi, Japan

[73] Assignee: Aisin-Warner Kabushiki Kaisha, Aichi, Japan

[21] Appl. No.: 212,155

[22] Filed: Jun. 23, 1988

Related U.S. Application Data

[63] Continuation of Ser. No. 889,329, Jul. 23, 1986, abandoned.

[30] Foreign Application Priority Data

Jul. 25, 1985 [JP] Japan ................. 60-162900
Jul. 25, 1985 [JP] Japan ................. 60-162901
Jul. 25, 1985 [JP] Japan ................. 60-162902
Jul. 25, 1985 [JP] Japan ................. 60-162903

[51] Int. Cl.$^5$ .............................. F16H 57/04
[52] U.S. Cl. ............................ 74/15.88; 74/467; 184/6.12
[58] Field of Search ........... 74/467, 15.4, 15.88; 184/6.12; 180/251, 297

[56] References Cited

U.S. PATENT DOCUMENTS

| | | | |
|---|---|---|---|
| 1,220,810 | 3/1917 | Alquist | 74/467 |
| 2,697,965 | 12/1954 | Armitage | 184/6.12 |
| 2,968,190 | 1/1961 | Orr | 184/6.12 |
| 2,995,211 | 8/1961 | Cohen | 184/6.12 |
| 3,097,546 | 7/1963 | Kelbel et al. | 74/467 |
| 3,529,698 | 9/1970 | Nelson | 184/6.12 |
| 3,625,310 | 12/1971 | Herrick | 184/6.12 |
| 3,834,248 | 9/1974 | Caliri | 74/467 |
| 4,355,542 | 10/1982 | Tsutsumi et al. | 184/6.12 |
| 4,356,889 | 11/1982 | Teeter | 184/6.12 |
| 4,367,661 | 1/1983 | Moroto et al. | 74/606 R |
| 4,442,729 | 4/1984 | Hayakawa | 184/6.12 |
| 4,531,421 | 7/1985 | Vieth | 184/6.12 |
| 4,577,524 | 3/1986 | Richards et al. | 74/411.5 |
| 4,699,249 | 10/1987 | Fujiura et al. | 184/11.1 |
| 4,721,184 | 1/1988 | Sowards | 184/6.12 |

FOREIGN PATENT DOCUMENTS 1270470 11/1986 U.S.S.R. ................. 74/467

Primary Examiner—Leslie A. Braun
Assistant Examiner—Scott Anchell
Attorney, Agent, or Firm—Dann, Dorfman, Herrell and Skillman

[57] ABSTRACT

A lubrication system is provided for a transmission mechanism supported on input and output shafts, and a chain drive rotatably connects these shafts. The chain and drive elements on the shafts are provided with a casing for isolating the mechanism, which collects an oil bath within the bottom of the transmission casing for lubricating a chain or other transmission member. An oil pump supplies oil from a reservoir to various areas to be specifically lubricated within the transmission. Feed means associated with the oil pump regulates the level of the transmission oil bath. The system may additionally contain an oil strainer, an external cooler, a relief valve to limit the pressure from the oil pump, or various combinations of such elements. The various points of lubrication within the casing, in turn, drain into the casing. Oil level within the transmission casing is regulated to keep the level low and at the same time to maintain sufficient oil for lubricating the chain.

8 Claims, 7 Drawing Sheets

LUBRICATING STRUCTURE FOR TRANSMISSION MECHANISM

RELATED APPLICATION

This application is a continuation application of U.S. application Ser. No. 889,329 filed July 23, 1986, now abandoned.

DETAILED DESCRIPTION OF THE INVENTION

1. Industrial Applicability

The present invention relates to a lubricating structure for a transmission mechanism, and principally to a lubricating structure for a transmission mechanism in an automatic transmission for vehicles.

2. Prior Art and Problems Thereof

A chain system transmission mechanism hitherto used with a transfer for a vehicle comprises an input shaft, an output shaft arranged parallel to said input shaft, a first sprocket provided on said input shaft, a second sprocket provided on said output shaft, a chain for transmission of rotation between said first and second sprockets, and a transmission mechanism casing which forms a transmission mechanism chamber for encasing said elements therein, whereby when said transmission mechanism is lubricated, lubricating oil collected on the bottom of the transmission mechanism chamber is stirred and distributed to other regions by rotation of the transmission mechanism to effect lubrication.

However, in the aforementioned conventional transmission mechanism, the quantity of lubricating oil scattered due to the stirring increases as the rotation of the transmission mechanism increases, and therefore the level of the lubricating oil left on the bottom of the transmission mechanism chamber lowers, tending to result in a shortage for lubrication. To cope with this problem, the quantity of lubricating oil employed is selected to provide sufficient lubrication even under the high speed rotation. However, as the result of higher oil level, the oil temperature tends to increase due to the stirring of the lubricating oil. Furthermore, heat is generated even by friction between link plates of the chain and between the link plate and the pin, which also causes a rise in oil temperature. The rise in oil temperature results in the deterioration of durability of seals, bearings and the like as well as the lubricating performance of lubricating oil.

NATURE OF THE PRESENT INVENTION

It is an object of the present invention to provide a lubricating structure which can positively prevent the rise in oil temperature of lubricating oil and which allows forced lubrication to occur.

A lubricating structure for a transmission mechanism according to the present invention is characterized by the provision of a transmission mechanism comprising an input shaft, an output shaft to which power from said input shaft is transmitted, a first rotary body provided on said input shaft, a second rotary body provided on said output shaft and a transmission member for transmission of rotation between said first and second rotary bodies, a transmission mechanism casing for isolating said transmission mechanism from the outside of the casing, and an oil bath within said transmission casing, said casing being provided with an oil pump so as to return discharged oil of said pump to said casing through an external cooler.

As the transmission mechanism rotates, the oil pump is driven to deliver lubricating oil within the casing to the external cooler, where oil is cooled after which it is again returned to the casing.

Since the lubricating oil of the transmission mechanism is forcibly delivered toward the external cooler, where the oil is cooled after which it is returned to the casing for recirculation, it is possible to positively prevent a rise in oil temperature, thus preventing the lowering of the durability caused by the rise in oil temperature and the lowering of the lubricating ability.

It is also possible to effect forced lubrication of the transmission mechanism, bearings, and the like, using the oil discharged from the oil pump.

According to a second aspect, the present invention is characterized by the provision of a transmission mechanism comprising an input shaft, an output shaft to which power from said input shaft is transmitted, a first rotary body provided on said input shaft, a second rotary body provided on said output shaft, and a transmission member for transmission of rotation between said first and second rotary bodies, and a transmission mechanism casing for isolating said transmission mechanism from the outside of the casing, said casing being internally provided with an oil bath which has a level set so as not to create stirring caused by the transmission mechanism, wherein an oil pump is provided whereby the transmission mechanism is subjected to forced lubrication by the discharged oil of said pump.

With the above-described arrangement, the rise in oil temperature caused by stirring the oil does not occur, and forced lubrication by the pump is sufficient to replace lubrication by stirring.

Since the lubricating oil of the transmission mechanism is never stirred, the rise in oil temperature caused by the stirring may be positively prevented and in addition, since the forced lubrication by the pump is carried out, no shortage of lubrication occurs.

According to a third aspect of the present invention, a pump mounted on a transmission mechanism of a transfer for a vehicle is associated with rotation of the transmission mechanism so as to be driven only when the transmission mechanism is driven.

The oil pump is driven so that lubricating oil within the transmission mechanism casing is fed to an external cooler where the oil is cooled after which it is again returned to the casing or the transmission mechanism and is subjected to forced lubrication.

According to the present invention, since the oil pump is driven only when the transmission mechanism is driven and the oil temperature rises, it is possible to prevent the entire structure from being lowered in efficiency to enhance the durability of the pump.

DESCRIPTION OF THE EMBODIMENTS

Figure 1:
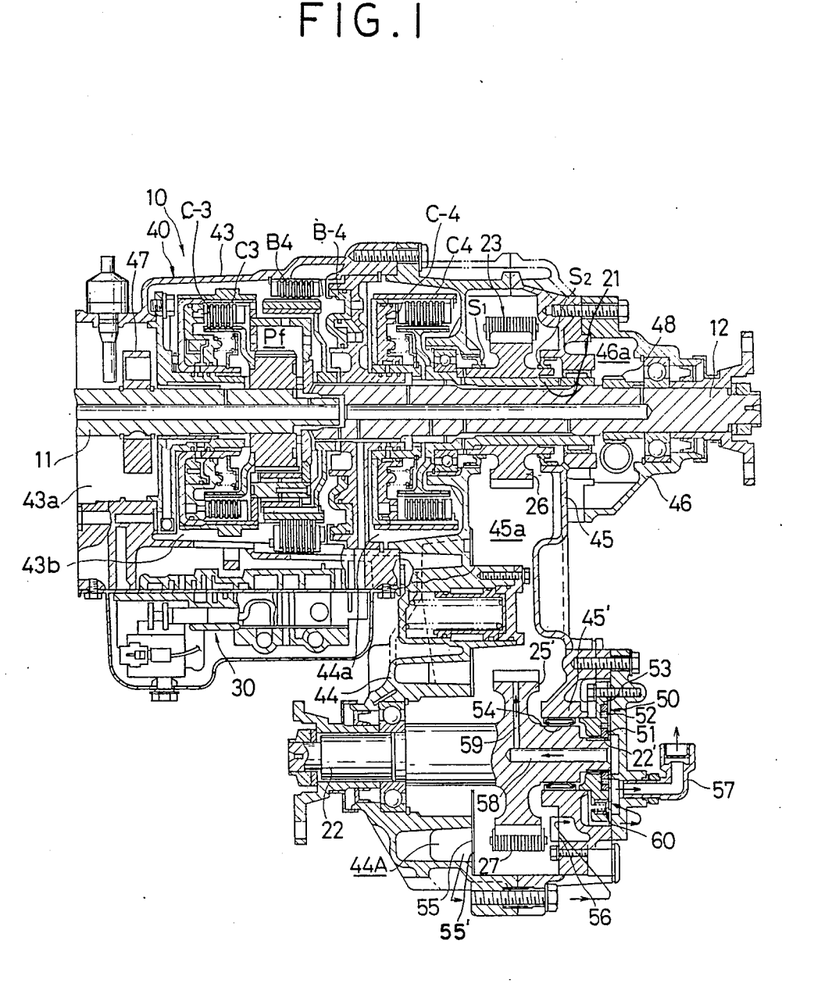
FIG. 1 is a sectional view of an embodiment in which the present invention is applied to a transmission mechanism of a transfer for a 4-wheel driven vehicle.

In FIG. 1, a transfer mechanism 10 has an input shaft 11 axially aligned with a first output shaft 12 in a transmission mechanism 23. Axially aligned with the shafts and related to their operation are a frictional engaging clutch $C_3$, a brake $B_4$, a clutch $C_4$, a planetary gear set Pf, and a 4-wheel drive sleeve 21. Clutch $C_4$ provides a 2 to 4-wheel switching mechanism. Planetary gear Pf is disposed between the input shaft 11 and the output shaft 12. Sleeve 21 provides an input shaft of the transmission mechanism rotatably externally slipped over the first output shaft 12. A second output shaft 22 of the transmission mechanism is juxtaposed parallel to the input shaft 11 and mounted opposedly of the first output shaft 12. The planetary gear set Pf and brake $B_4$ constitute an underdrive.

The clutch $C_4$ comprises a multi-plate friction clutch for intermittently connecting the sleeve 21 connected to one sprocket 26 of the transmission mechanism 23 for driving sprocket 25 and the second output shaft 22 of the transfer mechanism 10 from the first output shaft 12. The clutch $C_4$ is actuated by a hydraulic pressure servo C-4.

The transmission mechanism 23 is composed of a first sprocket 26 which is a first rotary body spline-fitted into the sleeve 21, a second sprocket 25 which is a second rotary body formed integral with the second output shaft 22 and a chain 27 which is the transmission mechanism extending between these sprockets 25 and 26, and driving sprocket 25.

In the normal travel, line pressure supplied to a hydraulic pressure control device of an automatic transmission is supplied to the hydraulic pressure servo C-3 of the clutch $C_3$ to bring the latter into engagement so that pressure of the hydraulic pressure servo B-4 and C-4 is discharged to release the brake $B_4$ and clutch $C_4$. Thereby, the planetary gear set Pf becomes integral and power is transmitted from the input shaft 11 to the first output shaft 12 with a reduction ratio of 1 to obtain the travel of 2-wheel drive by the rear wheels alone. At that time, power from the input shaft 11 is transmitted to the first output shaft 12 through the clutch $C_3$.

When shifting to 4-wheel drive from 2-wheel drive, a conventional shift lever (not shown) of the transfer mechanism 10 provided near the driver's seat as part of the shift mechanism is manually shifted to gradually supply line pressure from the transfer control device 30 to the hydraulic pressure servo C-4 to bring the clutch $C_4$ into smooth engagement. Then the first output shaft 12 and the sleeve 21 are connected to rotate together, whereby power is also transmitted to the front wheels via the transmission mechanism 23, the second output shaft 22 and the front wheel driving propeller shaft (not shown). Power transmission from the input shaft 11 to the first output shaft 12 and the second output shaft 22 with the reduction ratio of 1 provides a wheel drive direct-connection travel state (high-speed 4-wheel drive state).

When during the 4-wheel drive travel, an increase in output torque is necessitated on a sharp slope or the like, the shift lever is manually shifted. Then the hydraulic pressure to the hydraulic pressure servo actuates the switching valve between the high-speed 4-wheel drive state and the low-speed drive state to gradually supply line pressure to the hydraulic servo B-4. This action causes oil pressure of the hydraulic pressure servo C-3 to discharge with a suitable timing, thus gradually bringing the brake $B_4$ into engagement and smoothly releasing the clutch $C_3$. Thereby power is reduced form the input shaft 11 through the planetary gear set Pf and transmitted to the first and second output shafts 12 and 22 to obtain 4-wheel drive reduction travel state (low-speed 4-wheel drive state) having a great torque.

The sub-transmission 40 is composed of several casing parts. An extension housing 43 forms an input side chamber 43a, encasing therein an electronically controlled vehicle speed sensor 47. A reduction mechanism chamber 43b encases therein an under-drive. A front transmission mechanism casing 44 forms a switching mechanism chamber 44a encasing therein the the clutch $C_4$. A rear transmission casing 45 forms a transmission chamber 45a encasing therein the transmission mechanism 23 as well as including the front transmission mechanism casing 44. An extension housing 46 forming a rear chamber 46a encases therein a speed meter drive gear 48 and provides a rear cover for the transmission casing 40.

The transmission mechanism 44, 45 are isolated from other chambers by oil seals $S_1$ and $S_2$.

Oil pump 50 is preferably of the internal gear type, and a drive gear 51 is fitted at spline 22' into the other end of the second output shaft 22. Reference numeral 52 denotes a driven gear, and 53 is a pump body.

A spigot joint provides the fitting between a support 45' of bearing 54 and the pump body 53.

The casing 44 is interiorly formed with a reservoir 44A by a reservoir plate 55 for scattering oil.

The casings 44 and 45 are formed with an oil passage from the reservoir 44A, and oil is guided to a strainer 56. Foreign materials within the casing are collected to prevent breakage due to entry of foreign materials into the oil pump gear.

Figure 2:
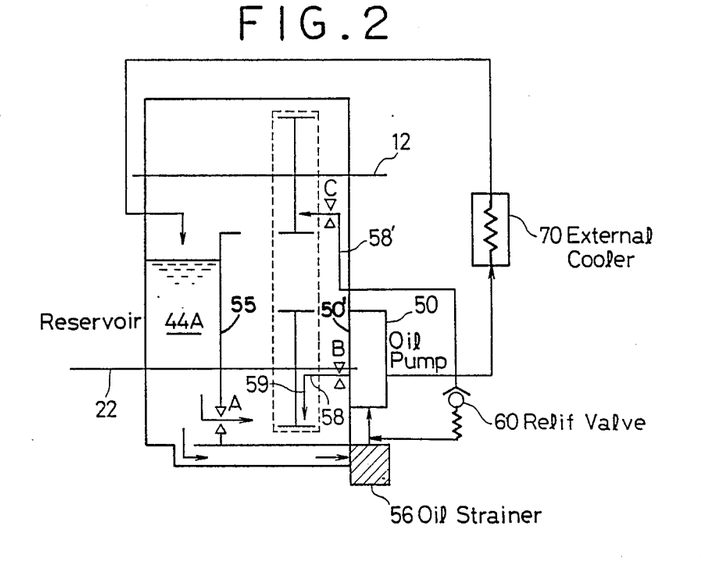
FIG. 2 is a schematic system diagram showing pump circuitry in one embodiment.
Figure 10:
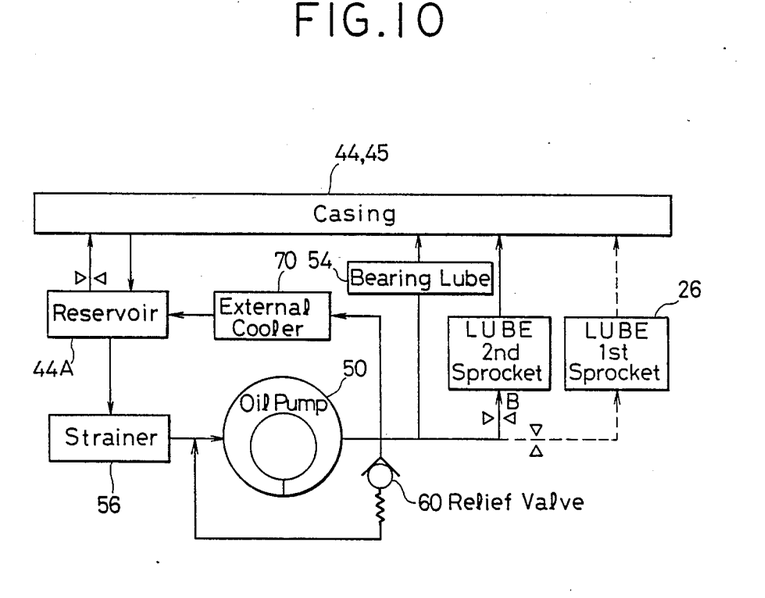
FIG. 10 is an oil circulation diagram for lubrication of bearings concurrently with lubrication of the transmission mechanism of the present invention.

Oil from the strainer 56 is guided toward the suction side of the pump 50, and the discharge side of the pump is returned from a pipe joint 57 to the reservoir 44A via an external cooler 70 as shown in various embodiments shown in the oil distribution systems shown in FIGS. 2 and 10.

As shown in FIGS. 2, 4, 7, 8 and 9, the pump discharge side is connected to an axial oil passage 58 of the second output shaft 22 through an orifice B, and lubricating oil is forcibly supplied from a diametral oil passage 59 to the chain 27 by the centrifugal force. Reference numeral 60 designates a relief valve, and when discharge pressure higher than the set oil pressure is generated, the discharged oil is fed back to the oil passage on the intake side via the relief valve 60.

The flow of oil is schematically indicated by a line having arrow heads in FIG. 1. FIG. 2 shows one example of a circuit arrangement not completely shown in the embodiment shown in FIG. 1. Part of the oil is circulated to the external cooler 70 directly back to reservoir 44A. The first sprocket 26 can be subjected to forced lubrication by feeding part of the oil discharged from the oil pump by a piping or passage 58'. An orifice A, an orifice B and an orifice C are provided in a reservoir plate 55, a plate 50' within the pump and a lubricating piping 58', respectively. While in the illustrated embodiment, an oil strainer 56 is provided in the casing 45, it can be provided anywhere in the intake oil passage of the pump. It may be noted that in place of the strainer 56, a magnet or a filter may be arranged within the reservoir. The relief valve 60 is provided on the pump body 53. The relief valve and the orifices as described above may be adjusted to obtain the optimum flow rate of lubricating oil.

Other circuit arrangements according to the present invention are seen in FIGS. 3 to 9.

Figure 3:
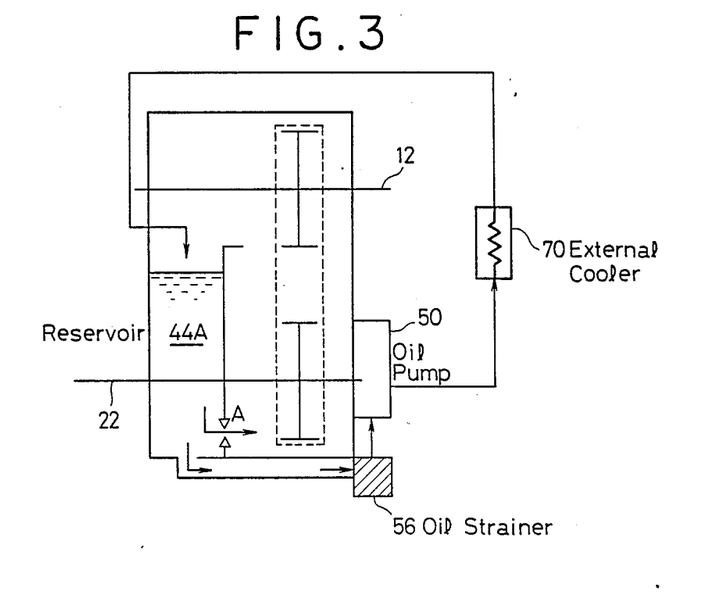
FIG. 3 is a similar schematic diagram to FIG. 2 showing another embodiment.

FIG. 3 shows a lubricating system in which the discharged oil of the pump 50 is recirculated only for the external cooling in external cooler 70 without a relief valve.

Figure 4:
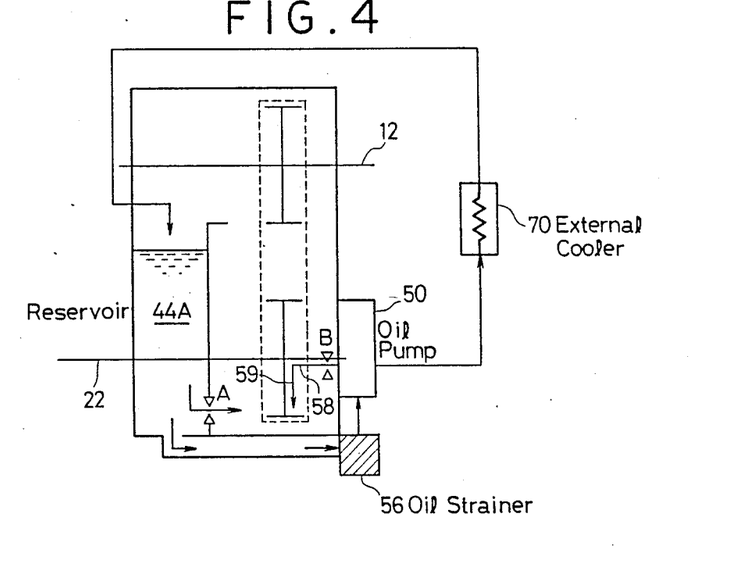
FIG. 4 is a schematic diagram similar to FIGS. 2 and 3 showing still another embodiment.

FIG. 4 shows a lubricating system in which in addition to the external cooling, the second sprocket 25 is subjected to forced lubrication. Again, no relief valve is provided.

Figure 5:
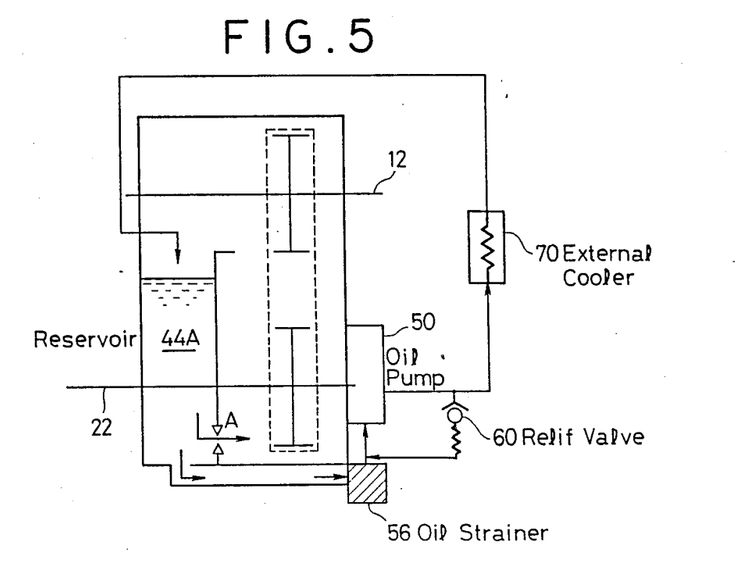
FIG. 5 is a schematic diagram similar to FIGS. 2 to 4 showing still another embodiment.

FIG. 5 shows a lubricating system in which a relief valve 60 is added between the discharge and intake sides of the pump of the embodiment shown in FIG. 3. The mechanical efficiency of the pump may be enhanced by this arrangement.

Figure 6:
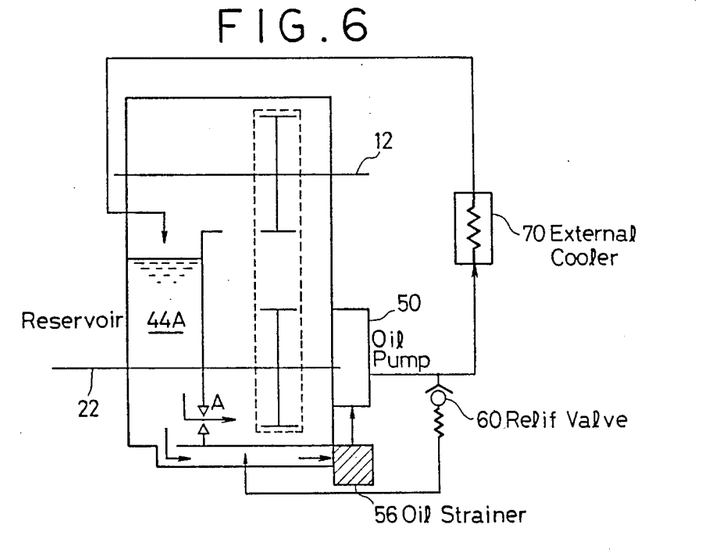
FIG. 6 is a schematic diagram similar to FIGS. 2 to 5 showing still another embodiment.

FIG. 6 shows a lubricating system in which an outlet of the relief valve 60 serves as a drain.

Figure 7:
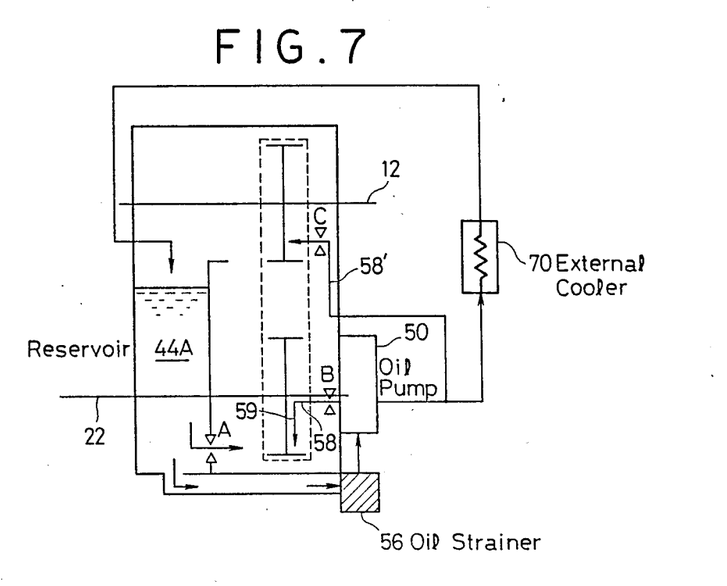
FIG. 7 is a schematic diagram similar to FIGS. 2 to 6 showing still another embodiment.

FIG. 7 shows a lubricating system in which the relief valve is removed, and the external cooling and the forced lubrication of the first and second sprockets are carried out by the discharged oil.

Figure 8:
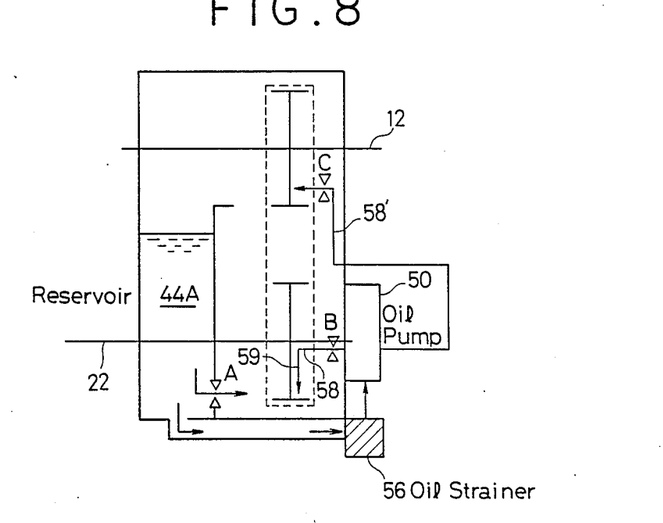
FIG. 8 is a schematic diagram similar to FIGS. 2 to 7 showing still another embodiment.

FIG. 8 shows a lubricating system in which the external cooling is not carried out but only the forced lubrication of the first and second sprockets is carried out.

Figure 9:
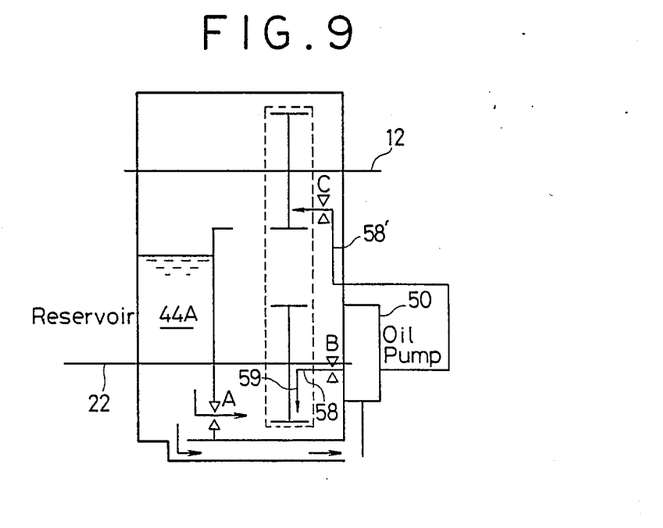
FIG. 9 is a schematic diagram similar to FIGS. 2 to 8 showing still another embodiment.

FIG. 9 shows a lubricating system which is different from FIG. 8 in that the strainer 56 is not provided. Instead of the strainer, a magnet or a filter is arranged within the reservoir. Again, no relief valve is provided.

While in this embodiment, a chain is applied to the transmission mechanism, it is to be noted that a method for transmitting power by engagement of gears can be employed, and other conventional transmission methods may be substituted.

FIG. 10 shows the circulation of oil where lubrication even to bearings is provided. Lubrication of the bearing 54 is not shown in FIG. 1 but the bearing 54 is also applied with the forced lubrication by the provision of a diametral oil passage.

It is to be noted that the present invention may also be applied to the transmission mechanism for a vehicle in which the engine is laterally positioned. In such case, the transmission mechanism may comprise a hypoid gear, or the like.

Figure 11:
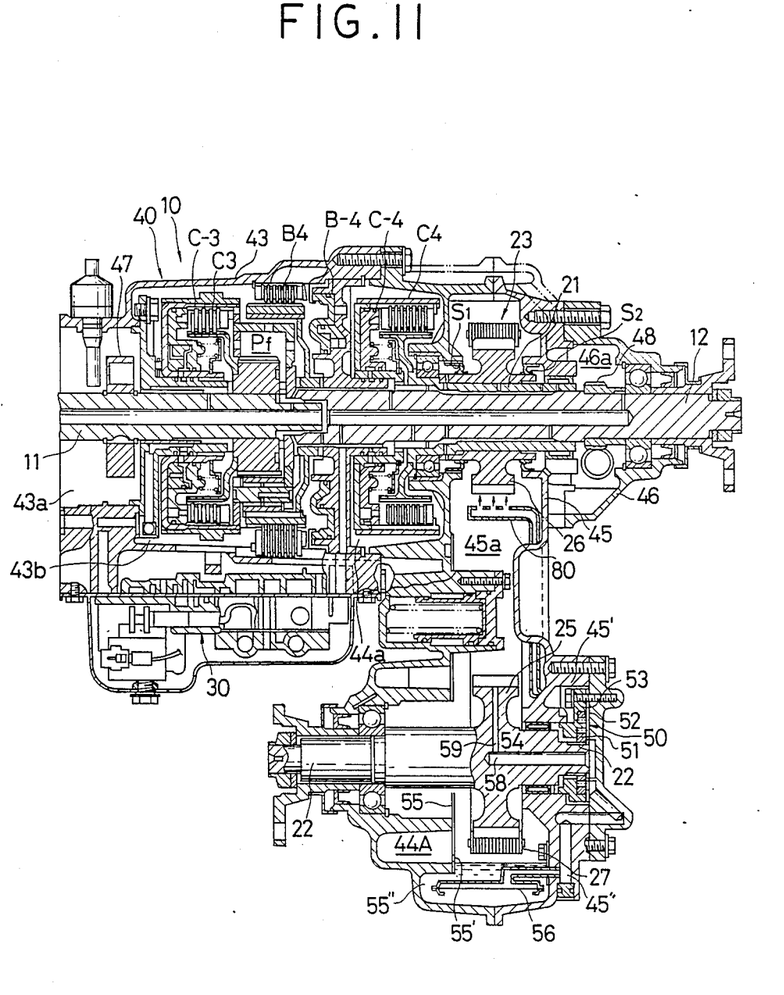
FIG. 11 is a sectional view of an embodiment of a transmission for a 4-wheel driven vehicle to which an oil bath type lubricating structure of the present invention is applied.

An embodiment of an oil bath type lubricating apparatus without being attended by the stirring of lubricating oil is shown in FIG. 11. Symbols used in FIG. 11 to denote elements are similar to those used to describe previous Figures. Therefore, repetition of description need not be made.

The casing 44 is interiorly formed with the reservoir 44A by the reservoir plate 55 to accommodate oil scattered by the forced lubrication. The oil within the reservoir 44A flows from the orifice 55' to the oil bath 55". The volume of the oil bath is variable depending on the quantity of oil required but the volume may be reduced by a combined use of the reservoir plate 55. An oil level of the oil bath 55" is set to a level at which the stirring by the chain 27 does not occur.

The oil from the oil bath is passed through the strainer 56, and foreign materials within the casing are collected to prevent the breakage caused by the entry of foreign material into the oil pump gear. The oil is guided from the strainer 56 toward the suction side of the pump 50 via the oil passage 45". The discharge side is connected to the axial oil passage 58 of the output shaft 22, and lubricating oil is supplied from the diametral oil passage 59 to the chain 27 by the centrifugal force. The discharge side is likewise connected to the tube 80, and the oil is injected from the end thereof to force-lubricate the first sprocket 26.

Although not shown, the bearings or the like can be lubricated by directing oil through the oil passages in the casing and shaft as well as by piping or tubing, as is conventional.

While in the illustrated embodiment, the chain is applied to the transmission mechanism, it should be noted naturally that the method for transmitting power by engagement between the gears or other methods can be also employed.

As already mentioned in the previous embodiments, the present invention can be applied to the transmission mechanism for vehicles in which the engine is laterally positioned.

In order that the oil pump will be driven only when the transmission mechanism is driven in addition to drive means already shown, the pump 50 may be driven by rotation of the sprockets 26, 25, for example, the hub of the clutch $C_4$, the drive shaft (sleeve) 21 or the like. In case of the gear drive, a countershaft or the like may be used to drive the pump. Any such variation produces similar effects to those described above.

Other modifications to the invention may occur to those skilled in the art. All such modifications within the scope of the claims are intended to be within the scope and spirit of the present invention.

What is claimed is:

1. A transmission mechanism comprising:
   a first shaft,
   a sleeve provided coaxial with the first shaft,
   a first sprocket coaxially connected to the sleeve,
   a clutch connected between the first shaft and the sleeve,
   a second shaft parallel to the first shaft having an axial oil passage,
   a second sprocket connected to the second shaft having a radial oil passage connected to the axial passage of the second shaft,
   a chain extending between the first sprocket and the second sprocket,
   a casing supporting at least the second shaft and forming an enclosed transmission mechanism chamber and a reservoir formed by a reservoir plate dividing the portion of transmission mechanism chamber from which oil in the transmission mechanism chamber is scattered by the chain from the reservoir, said reservoir and reservoir plate being disposed in axially juxtaposed relationship with said second sprocket, and said reservoir being adapted to accommodate the scattered oil and to return a part of said oil to said portion of the transmission mechanism chamber through an orifice provided in the reservoir plate, an oil pump supported on the casing, connected between the reservoir and the axial oil passage of the second shaft, and connected to be driven by the second shaft, and means for coupling the oil pump to an external cooler and means for coupling the cooler to the reservoir to permit return of oil from the pump.

2. The lubricating structure as set forth in claim 1 in which said reservoir is disposed about said second sprocket.

3. A transmission mechanism comprising:
a first shaft,
a sleeve provided coaxial with the first shaft,
a first sprocket coaxially connected to the sleeve,
a clutch connected between the first shaft and the sleeve,
a second shaft parallel to the first shaft having an axial oil passage,
a second sprocket connected to the second shaft having a radial oil passage connected to the axial passage of the second shaft,
a chain extending between the first sprocket and the second sprocket,
a casing supporting at least the second shaft and forming an enclosed transmission mechanism chamber and a reservoir formed by a reservoir plate dividing the portion of the transmission mechanism chamber from which oil in the transmission mechanism chamber is scattered by the chain from the reservoir, said reservoir and reservoir plate being disposed in axially juxtaposed relationship with said second sprocket, and said reservoir being adapted to accommodate the scattered oil and to return a part of said oil to said portion of the transmission mechanism chamber through an orifice provided in the reservoir plate, and
an oil pump supported on the casing, connected between the reservoir and the axial oil passage of the second shaft, and connected to be driven by the second shaft through a gear coupling.

4. The lubricating structure as set forth in claim 3 in which said reservoir is disposed about said second sprocket.

5. A transmission mechanism comprising:
a first shaft,
a sleeve provided coaxial with the first shaft,
a first sprocket coaxially connected to the sleeve,
a clutch connected between the first shaft and the sleeve,
a second shaft parallel to the first shaft having an axial oil passage,
a second sprocket connected to the second shaft having a radial oil passage connected to the axial passage of the second shaft,
a chain extending between the first sprocket and the second sprocket,
a casing supporting at least the second shaft and forming an enclosed transmission mechanism chamber and a reservoir formed by a reservoir plate dividing the portion of the transmission mechanism chamber from which oil in the transmission mechanism chamber is scattered by the chain from the reservoir, said reservoir and reservoir plate being disposed in axially juxtaposed relationship with said second sprocket, and said reservoir being adapted to accommodate the scattered oil and to return a part of said oil to said portion of the transmission mechanism chamber through an orifice provided in the reservoir plate, an oil pump connected to the reservoir supported relative to the casing, and connected to be driven by the second shaft, and means for coupling the oil pump to an external cooler and means coupling the cooler to the reservoir to permit return of oil from the pump and orifice means provided between the oil pump and the axial oil passage of the second shaft.

6. The lubricating structure as set forth in claim 5 in which said reservoir is disposed about said second sprocket.

7. A transmission mechanism comprising:
a first shaft,
a sleeve provided coaxial with the first shaft,
a first sprocket coaxially connected to the sleeve,
a clutch connected between the first shaft and the sleeve,
a second shaft parallel to the first shaft having an axial oil passage,
a second sprocket connected to the second shaft having a radial oil passage connected to the axial passage of the second shaft,
a chain extending between the first sprocket and the second sprocket,
a casing supporting at least the second shaft and forming an enclosed transmission mechanism chamber and a reservoir formed by a reservoir plate dividing the portion of the transmission mechanism chamber from which oil in the transmission mechanism chamber is scattered by the chain from the reservoir, said reservoir and reservoir plate being disposed in axially juxtaposed relationship with said second sprocket, and said reservoir being adapted to accommodate the scattered oil and to return a part of said oil to said portion of the transmission mechanism chamber through an orifice provided in the reservoir plate, and
an oil pump having an oil pump body connected to the casing, having an oil pump drive gear axially connected to the second shaft, and being connected to the transmission mechanism chamber through the axial passage of the second shaft,
an orifice provided in the reservoir plate to connect the reservoir to the transmission mechanism chamber, but limiting flow of oil therethrough in order to have an oil level in the transmission mechanism chamber set to a level at which the stirring by the chain does not occur under normal operating conditions,
a conduit, connected at one end to the oil pump, and at the other end injecting oil to the first sprocket under pressure by the oil pump, and
means for coupling the oil pump to an external cooler and means for coupling the cooler to the reservoir to permit return of oil from the pump.

8. The lubricating structure as set forth in claim 7 in which said reservoir is disposed about said second sprocket.

* * * * *

UNITED STATES PATENT AND TRADEMARK OFFICE
CERTIFICATE OF CORRECTION

PATENT NO. : 4,922,765
DATED : May 8, 1990
INVENTOR(S) : Yoichi HAYAKAWA, Takahiro YAMASHITA, Kazuaki WATANABE and Yoshiharu HARADA It is certified that error appears in the above-identified patent and that said Letters Patent is hereby corrected as shown below:

On the cover page of the patent, please add the following additional Assignee:

--Toyota Jidosha Kabushiki Kaisha of Aichi-ken, Japan--.

Signed and Sealed this

Tenth Day of March, 1992

Attest:

HARRY F. MANBECK, JR.

*Attesting Officer*  *Commissioner of Patents and Trademarks*